A. B. HURD.
Gate.
No. 64,108.                                             Patented April 23, 1867.
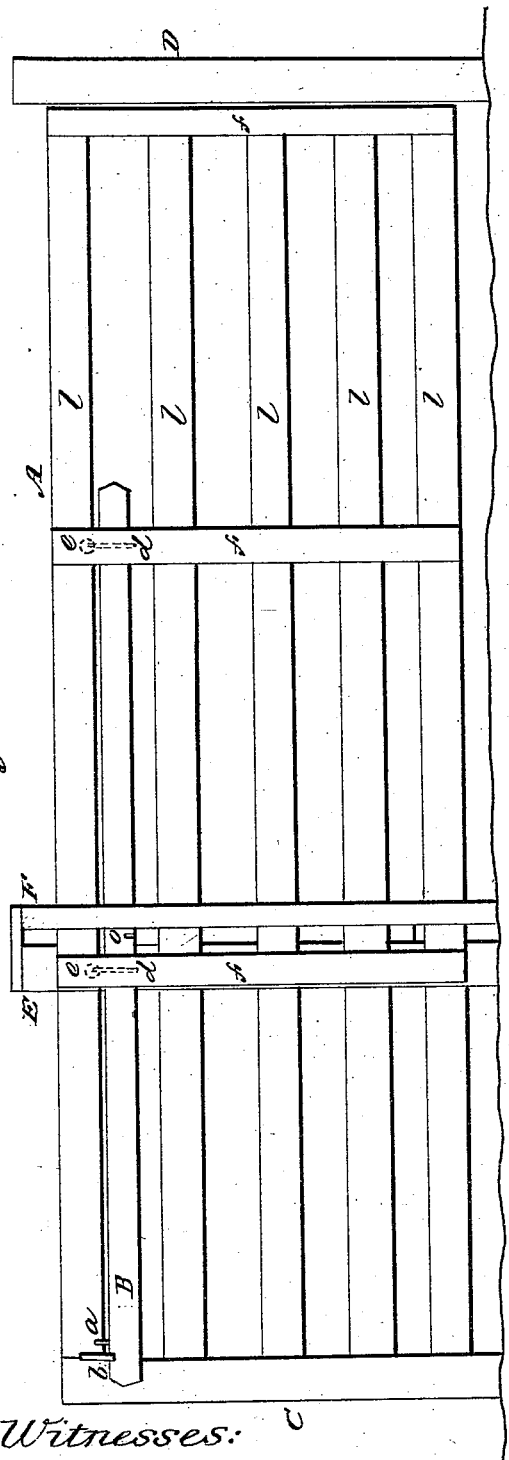
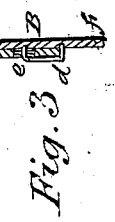
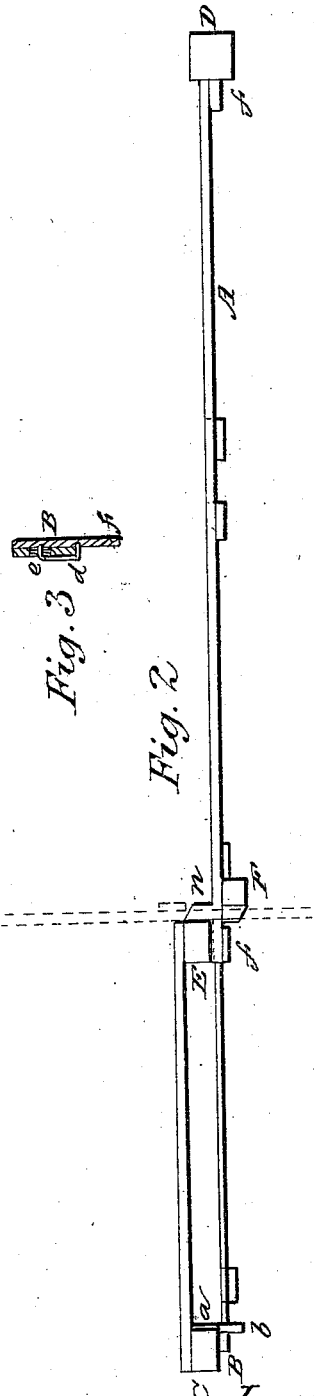
Witnesses:
O. F. Dodge.
Inventor:
A. B. Hurd
By W. C. Dodge,
Atty

United States Patent Office.

A. B. HURD, OF WATKINS, NEW YORK.

Letters Patent No. 64,108, dated April 23, 1867.

---

GATE.

---

The Schedule referred to in these Letters Patent and making part of the same.

---

TO ALL WHOM IT MAY CONCERN:

Be it known that I, A. B. HURD, of Watkins, Schuyler county, in the State of New York, have invented certain new and useful improvements in Gates; and I do hereby declare that the following is a clear, full, and exact description thereof, reference being had to the accompanying drawings, making part of this specification, and to the letters of reference marked thereon, like letters indicating like parts whenever they occur.

Figure 1 is a side elevation.
Figure 2 is a top plan view; and
Figure 3, a portion of the same shown in section.

I construct the gate A of ordinary fence boards, $l$, secured together by cross-bars, $f$, in the usual manner. I then set two posts, E and F, so as to stand diagonally in relation to the line of the fence, as shown in figs. 1 and 2, and connect them by one or more cleats, $n$, as shown in fig. 2, the cleats being nailed in a horizontal position to the posts. On the upper one of those cleats a bar, B, is pivoted by a pin, $o$, shown in dotted line in fig. 1, said bar B extending forward to about the centre of the gate, and also backward for about the same distance, its rear end engaging under a projecting hook, $b$, secured to the post C in rear of the gate. The gate A is mounted on the bar B, and held there by means of the staples $d$, shown in dotted lines in fig. 1, and more clearly in fig. 3, these staples embracing said bar B, and being driven into or otherwise secured to the middle and rear cross-bars $f$. A friction-pulley, $e$, is secured on the upper portion of these staples $d$, and rests on the rail B, thus supporting the weight of the gate A. When the gate is closed, as represented in fig. 1, its front end is supported by the post D, there being proper recesses for the ends of the boards or rails $l$ to enter.

To operate it, the gate is shoved back on the bar B until its rear end strikes the pin or stop $a$, or about half the length of the gate, as shown in red in fig. 2, in which position it will be nearly balanced on the bar B, and by raising the front end slightly, the rear end of said bar B is disengaged from the hook $b$, and it, with the gate on it, may then be turned on the pivot $o$ to the position indicated in blue in fig. 2. When it is desired to close it, the gate is first swung back in line with the fence until the rear end of the bar B engages again under the hook $b$, and the gate then drawn or shoved shut.

It will be observed that when closed the weight of the gate is brought to bear vertically on the three posts E, F, and D, and that when open it bears vertically on the posts E and F, and that hence there is no tendency whatever in this gate to cause the posts to sag or lean to one or the other side.

No metal or other hinges are required, and I am thus enabled to produce a simple, cheap, efficient, and durable gate, one that can be readily made by almost any person, at very small expense, and that is not liable to get out of order.

Having thus described my invention, what I claim is—

1. The bar B, pivoted on the cleat $n$, and having its rear end engaging with the hook $b$, as a support for the gate A, substantially as shown and described.

2. I claim mounting the gate A on friction-rollers, arranged to run on the bar B, and having both gate and bar swing around, as set forth.

3. The staples $d$, with the friction-rollers mounted thereon and said staples arranged to embrace the bar, as shown and described.

A. B. HURD.

Witnesses:
H. H. SMITH,
T. H. ABBEY.